US008928277B2

(12) United States Patent
Xiang et al.

(10) Patent No.: US 8,928,277 B2
(45) Date of Patent: Jan. 6, 2015

(54) ELECTRONIC CIGARETTE AND A WIRELESS CHARGING DEVICE FOR THE SAME

(75) Inventors: Zhiyong Xiang, Guangdong (CN); Xiaozhong Cheng, Guangdong (CN)

(73) Assignee: Kimree Hi-Tech Inc, Road Town, Tortola (VG)

( * ) Notice: Subject to any disclaimer, the term of this patent is extended or adjusted under 35 U.S.C. 154(b) by 11 days.

(21) Appl. No.: 13/519,867

(22) PCT Filed: Jan. 28, 2011

(86) PCT No.: PCT/CN2011/070770
§ 371 (c)(1),
(2), (4) Date: Jun. 28, 2012

(87) PCT Pub. No.: WO2012/100430
PCT Pub. Date: Aug. 2, 2012

(65) Prior Publication Data
US 2013/0298922 A1    Nov. 14, 2013

(51) Int. Cl.
*H02J 7/00* (2006.01)
*A24F 47/00* (2006.01)
*H02J 7/02* (2006.01)

(52) U.S. Cl.
CPC .............. *A24F 47/008* (2013.01); *H02J 7/025* (2013.01)
USPC ......................................... 320/108; 131/273

(58) Field of Classification Search
CPC ...................................................... H02J 7/025
USPC .................. 320/108, 115; 131/273, 329, 330
See application file for complete search history.

(56) References Cited

U.S. PATENT DOCUMENTS

| 5,144,962 | A | * | 9/1992 | Counts et al. | 131/194 |
| 5,269,327 | A | * | 12/1993 | Counts et al. | 131/194 |
| 2004/0261802 | A1 | * | 12/2004 | Griffin et al. | 131/194 |
| 2009/0283103 | A1 | * | 11/2009 | Nielsen et al. | 131/273 |
| 2012/0227753 | A1 | * | 9/2012 | Newton | 131/347 |

FOREIGN PATENT DOCUMENTS

| CN | 101116542 A | 2/2008 |
| CN | 101286410 A | 10/2008 |
| CN | 201134682 Y | 10/2008 |
| CN | 201384062 Y | 1/2010 |
| KR | 20090008914 U | 9/2009 |

* cited by examiner

*Primary Examiner* — Richard V Muralidar
(74) *Attorney, Agent, or Firm* — Tim Tingkang Xia, Esq.; Morris, Manning & Martin, LLP

(57) ABSTRACT

An electronic cigarette and a wireless charging device for the same. The electronic cigarette comprises a receiving coil electrically connected with a battery. The receiving coil is provided in a body of the electronic cigarette and an axis of the coil is parallel to the electronic cigarette. The charging device comprises an electronic switch and a transmitting coil connected with a power source in sequence. The electronic switch is controlled by a transmitting control unit, and the transmitting coil is used for the electronic cigarette to be inserted therein. A housing of the charging device is provided with an inserting hole or a sleeve, which is placed correspondingly with the transmitting coil. The electronic cigarette and the wireless charging device for the same work in a non-contact manner by using a insert total electromagnetic coupling structure.

6 Claims, 3 Drawing Sheets

ELECTRONIC CIGARETTE AND A WIRELESS CHARGING DEVICE FOR THE SAME

FIELD OF THE PRESENT INVENTION

The present invention relates to electronic cigarette, particularly to an electronic cigarette providing users with more comfortable feeling and a wireless charging device for the same.

BACKGROUND OF THE PRESENT INVENTION

An electronic cigarette comprises a battery, and a heat generator for atomizing tobacco tars. Once the battery is out of power, tobacco tars cannot be atomized, thus the electronic cigarette is not available for use. When the battery runs out, it is needed to be charged. In traditional electronic cigarettes, the battery components directly contact a charger or a charging cable to form an electric connection. However, it is not convenient for users to carry the charger or the charging cable along with them when smoking. Furthermore, they cannot really enjoy the interests of smoking when always bothered by pulling off/inserting/fixing/loosing charging devices. At present, no electronic cigarette using a wireless charging device or similar devices has been disclosed.

On the other hand, there are other wireless charging devices nowadays, such as a wireless charging device in an IPHONE. The wireless charging device is large in volume. Further, it contains a receiving coil far away from the transmitting coil and the receiving coil is provided outside the transmitting coil, causing a low transmitting efficiency. What's more, the wireless charging device cannot be used for inserting or holding the electronic cigarette.

SUMMARY OF THE PRESENT INVENTION

In viewing thereof, the present invention is directed to solve the problems existing in the prior art. Accordingly, an electronic cigarette, and a wireless charging device for the same are provided, which don't have to contact with the electronic cigarette when charging and consequently will not influence user smoking during the charging process.

According to an aspect of the present invention, a wireless charging device for electronic cigarette is provided. The wireless charging device comprises a housing and an internal charging circuit. The internal charging circuit comprises an electronic switch and a transmitting coil connected with a power source in sequence. The electronic switch is controlled by a transmitting control unit, and the electronic cigarette could be inserted inside the transmitting coil. The housing is provided with an inserting hole or a sleeve corresponding with the transmitting coil and being used for inserting the electronic cigarette. In that way, the present invention break through the traditional technique that separating the wireless charging device and the receiving portion away from each other as far as possible. In addition, the skillful application of the inserting hole or the sleeve for inserting the electronic cigarette provides more convenience, and the inconvenience caused by conventional technique could be avoided.

Said transmitting coil is preferred to, but is not limited to, be wrapped outside said sleeve.

A compensation capacitor is connected in parallel with the transmitting coil, in order to improve the transmitting efficiency.

A current limiting resistor is connected in serial with the transmitting coil, in order to reduce the amount of heat sinks on the transmitting coil.

There is one or more transmitting coils and corresponding inserting holes or sleeves, so as to charge multiple electronic cigarettes simultaneously.

According to another aspect of the present invention, an electronic cigarette is provided. The electronic cigarette comprises a battery and an atomizer, and a rectification unit and a receiving coil connected with the battery in sequence. The receiving coil is provided in the body of the electronic cigarette and the axis of the coil is parallel to the electronic cigarette. When the electronic cigarette is inserted in the wireless charging device, the receiving coil is inserted inside the transmitting coil of the wireless charging device.

Said receiving coil is provided on an upper part, middle part, or head part of the electronic cigarette, wherein the head part of the electronic cigarette is preferred.

Said rectification unit comprises an output stabilization voltage regulator diode.

Said receiving coil is installed inside the housing of the electronic cigarette or wrapped outside the housing, wherein, installation inside the housing is preferred.

Said atomizer comprises a heating element, wherein, a resistance wire is preferred.

According to the wireless charging device of the present invention, the electronic cigarette can be charged by means of forming a non-contact and inserting structure. Further, the wireless charging device can be used as an inserting sleeve for arranging and placing the electronic cigarette. Compared to those in the prior art, the wireless charging device disclosed by the present invention provides the advantages of: 1) wireless connection and convenient for charging; 2) the wireless charging device is simple in structure and small in volume compared to those in the prior art; 3) the electronic cigarette is charged by inserting in the wireless charging device and forming a total electromagnetic coupling structure, which has greatly improved the receiving efficiency in comparison with other wireless charging structures, for example the structure of installing the receiving coil far away from the transmitting coil in the prior art; 4) the wireless charging device provides a place for holding the electronic cigarette, and provides a convenience that the users can smoking during the charging process.

DETAILED DESCRIPTION OF THE EMBODIMENT

Figure 1:
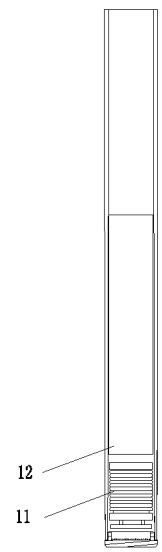
FIG. 1 is a schematic view of an electronic cigarette according to an embodiment of the present invention.

As shown in FIG. 1, an electronic cigarette according to the present invention is provided, comprising a battery 12 installed on the body of the electronic cigarette, and a receiving coil 11 provided on the head part of the electronic cigarette located in front of the battery 12. The receiving coil 11 is also labeled as L2 in FIG. 3 and FIG. 4.

Figure 2:
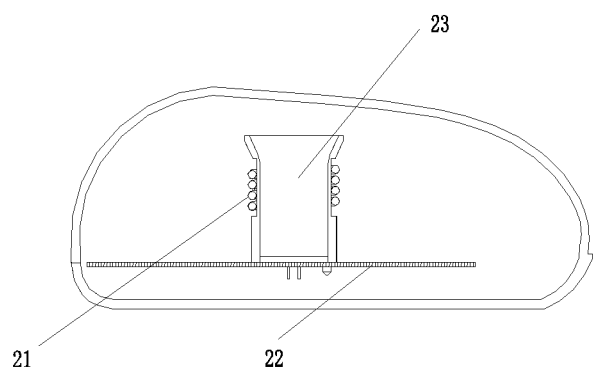
FIG. 2 is a schematic view of a wireless charging device for electronic cigarette according to an embodiment of the present invention.

As shown in FIG. 2, a wireless charging device for the electronic cigarette according to the present invention is provided, comprising a circuit board 22, a sleeve 23, and a transmitting coil 21. The transmitting coil 21 is also labeled as L1 in FIG. 3 and FIG. 5. The transmitting coil 21 is wrapped outside the sleeve 23, corresponding to the position for inserting the receiving coil 11 of the electronic cigarette. When the electronic cigarette is installed, the receiving coil 11 is inside the transmitting coil 22 with the axes of the two coils in the same direction, thus forming an insert total electromagnetic coupling structure.

Figure 3:
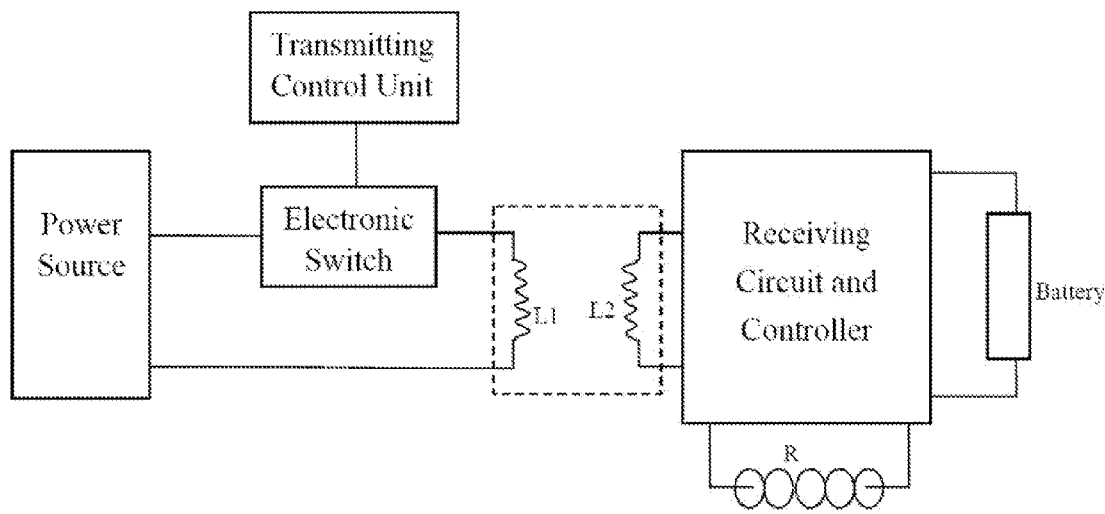
FIG. 3 is a schematic diagram showing the circuit principle of an electronic cigarette and a wireless charging device according to an embodiment of the present invention.

Referring to FIG. 3, the circuit of the electronic cigarette comprises a battery, a heating wire R, a receiving coil L2, and a receiving circuit and a controller containing a rectification unit. The circuit of the wireless charging device comprises an electronic switch and a transmitting coil L1 electrically connected with a power source in sequence. The electronic switch is provided with a transmitting control unit. The transmitting coil L1 and the receiving coil L2 are configured to cooperate with each other.

Figure 4:
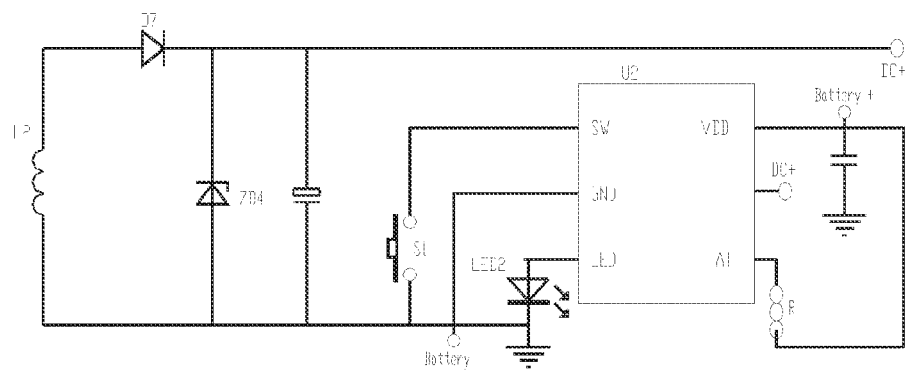
FIG. 4 is a schematic diagram showing the circuit structure of the electronic cigarette in FIG. 3.
Figure 5:
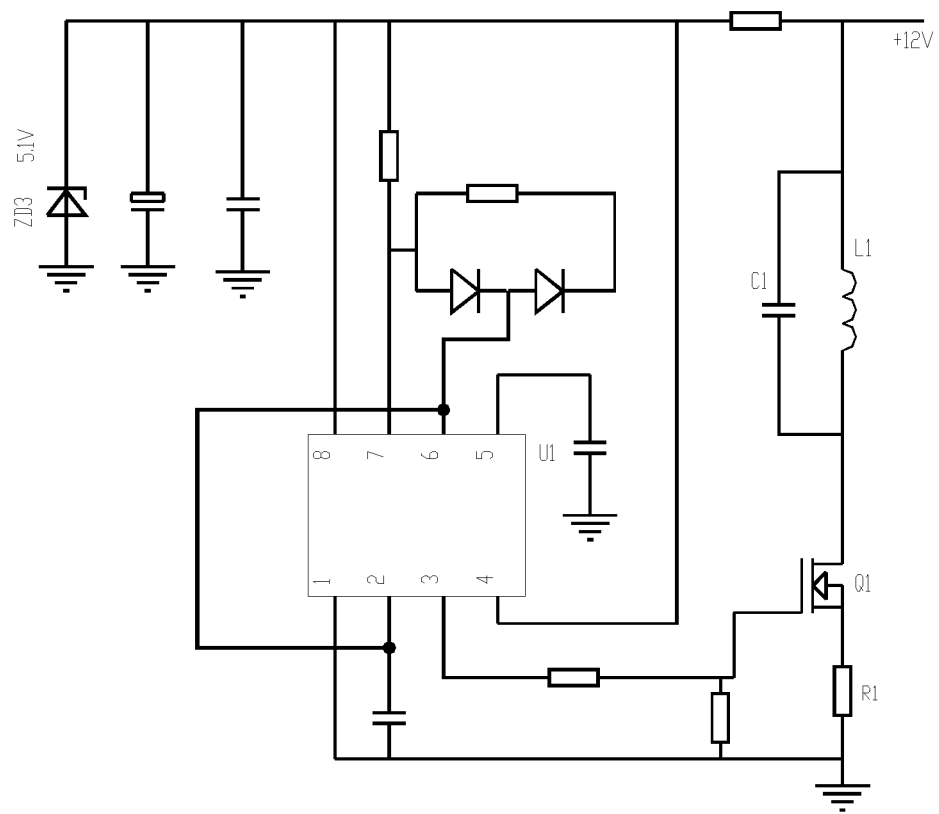
FIG. 5 is a schematic diagram showing the circuit structure of the wireless charging device in FIG. 3.

Referring to FIG. 4 and FIG. 5, detailed circuit structures of the wireless charging circuit and the electronic cigarette are shown. A receiving coil L2 contributed to the charging process, a rectification diode D7, a capacitor, and a voltage regulator diode ZD4 are added into the circuit of a prior electronic cigarette (which comprises a battery, a control chip U2, a heating wire R, and an atomizer switch S1). The wireless charging device comprises a transmitting control chip U1, an electronic switch Q1, a transmitting coil L1, a compensation capacitor C1 connected in parallel with the transmitting coil L1 in order to improve the transmitting efficiency, a current limiting resistor R1 connected in serial with the transmitting coil L1 to reduce a current in the transmitting coil L1 and further reduce the amount of heat sinks.

According to the present invention, the wireless charging device is particularly suitable for electronic cigarette. In that way, the users are able to smoke while charging. Therefore, the electronic cigarettes can be further promoted, and smokers who are suffered from smoking traditional tobaccos can enjoy smoking without harm to their health in a low cost.

Although explanatory embodiments have been shown and described, it would be appreciated by those skilled in the art that changes, alternatives, and modifications all falling into the scope of the claims and their equivalents may be made in the embodiments without departing from spirit and principles of the present invention.

What is claimed is:

1. A wireless charging device for electronic cigarette, comprising a housing and an internal charging circuit, wherein:
   the internal charging circuit comprises an electronic switch and a transmitting coil electrically connected with a power source in sequence, in which the electronic switch is controlled by a transmitting control unit, and the electronic cigarette is inserted inside the transmitting coil; and
   the housing is provided with an inserting hole or a sleeve corresponding to the transmitting coil for inserting the electronic cigarette, the electronic cigarette is provided with a receiving coil in a head part, when the electronic cigarette is installed, the receiving coil is inside the transmitting coil, and an axis of the receiving coil and an axis of the transmitting coil are in the same direction.

2. The wireless charging device according to claim 1, wherein the transmitting coil is wrapped outside the sleeve.

3. The wireless charging device according to claim 1, further comprising a current limiting resistor connected in serial with the transmitting coil.

4. The wireless charging device according to claim 3, further comprising a compensation capacitor connected in parallel with the transmitting coil.

5. The wireless charging device according to claim 1, further comprising a compensation capacitor connected in parallel with the transmitting coil.

6. The wireless charging device according to claim 1, wherein one or more transmitting coils and corresponding inserting holes or the sleeves are provided.

* * * * *